(12) United States Patent
Hidaka

(10) Patent No.: US 10,574,022 B2
(45) Date of Patent: Feb. 25, 2020

(54) OPTICAL COMPONENT, FIBER LASER UNIT, AND FIBER LASER SYSTEM

(71) Applicant: FUJIKURA LTD., Tokyo (JP)

(72) Inventor: Hikaru Hidaka, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/093,938

(22) PCT Filed: Feb. 23, 2017

(86) PCT No.: PCT/JP2017/006785
§ 371 (c)(1),
(2) Date: Oct. 15, 2018

(87) PCT Pub. No.: WO2017/183289
PCT Pub. Date: Oct. 26, 2017

(65) Prior Publication Data
US 2019/0089114 A1     Mar. 21, 2019

(30) Foreign Application Priority Data

Apr. 19, 2016  (JP) .................................. 2016-083503

(51) Int. Cl.
*H01S 3/067* (2006.01)
*G02B 6/02* (2006.01)
*H01S 3/04* (2006.01)
*H01S 3/094* (2006.01)

(52) U.S. Cl.
CPC ...... *H01S 3/06733* (2013.01); *G02B 6/02104* (2013.01); *H01S 3/0401* (2013.01); *H01S 3/0675* (2013.01); *H01S 3/094007* (2013.01)

(58) Field of Classification Search
CPC .............. G02B 6/02104; H01S 3/0675; H01S 3/06733; H01S 3/094007; H01S 3/0401
See application file for complete search history.

(56) References Cited

U.S. PATENT DOCUMENTS

| 8,665,916 B2 * | 3/2014 | Nishimura ............ H01S 3/0675 372/102 |
| 9,257,810 B2 * | 2/2016 | Miyauchi ............. G02B 6/3813 |
| 2008/0239471 A1 | 10/2008 | Tamaoki |
| 2009/0080835 A1 | 3/2009 | Frith |

(Continued)

FOREIGN PATENT DOCUMENTS

| CN | 103155308 A | 6/2013 |
| CN | 103814315 A | 5/2014 |

(Continued)

*Primary Examiner* — Michael Carter

(57) ABSTRACT

An optical component includes: a first fiber having a first end and a second end; a second fiber having a third end and a fourth end; a third fiber having a fifth end and a sixth end; a first coating layer that covers the cladding of the second fiber and has a higher refractive index than that of the cladding of the second fiber; and a first high refractive index layer that covers part of an outer peripheral surface and an end face of the second fiber. The first high refractive index layer has a higher refractive index than that of the cladding of the second fiber. The outer diameter of the cladding of the first fiber is smaller than that of the cladding of the second fiber. The outer diameter of the cladding of the third fiber is smaller than that of the cladding of the second fiber.

10 Claims, 6 Drawing Sheets

(56) References Cited

U.S. PATENT DOCUMENTS

| | | |
|---|---|---|
| 2013/0308661 A1 | 11/2013 | Nishimura et al. |
| 2014/0241385 A1 | 8/2014 | Fomin et al. |
| 2015/0010277 A1 | 1/2015 | Miyauchi |

FOREIGN PATENT DOCUMENTS

| | | |
|---|---|---|
| CN | 105026971 A | 11/2015 |
| EP | 2816382 A1 | 12/2014 |
| JP | 2008-187100 A | 8/2008 |
| JP | 2008-251694 A | 10/2008 |
| JP | 2009-069492 A | 4/2009 |
| JP | 2014-193806 A | 10/2014 |
| JP | 2015-505162 A | 2/2015 |
| JP | 5820034 B2 | 11/2015 |
| JP | 2016510135 A | 4/2016 |
| WO | 2013/001734 A1 | 1/2013 |
| WO | 2013/096363 A1 | 6/2013 |
| WO | 2013/145840 A1 | 10/2013 |

\* cited by examiner

OPTICAL COMPONENT, FIBER LASER UNIT, AND FIBER LASER SYSTEM

TECHNICAL FIELD

The present invention relates to an optical component, a fiber laser unit, and a fiber laser system.

Priority is claimed on Japanese Patent Application No. 2016-083503, filed Apr. 19, 2016, the content of which is incorporated herein by reference.

BACKGROUND

In a fiber laser, light propagating through a cladding (unnecessary light) may heat a coating which covers the cladding. To remove such light propagating through a cladding, the following structures, for example, have been proposed.

Patent Document 1 discloses an optical device including a first optical fiber and a second optical fiber fusion spliced with the first optical fiber, in which the diameter of the second optical fiber is greater than that of the first optical fiber. In the vicinity of the fusion splice point between the first optical fiber and the second optical fiber, the first optical fiber is surrounded by a first medium having a lower refractive index than that of the outermost shell structure of the first optical fiber and the outermost shell structure of the second optical fiber, while at least part of the second optical fiber is surrounded by a second medium having a higher refractive index than that of the outermost shell structure of the first optical fiber and the outermost shell structure of the second optical fiber.

According to the optical device, it is possible to prevent light propagating though the outermost shell structure of the first optical fiber toward the second optical fiber from leaking out to the first medium but allow the propagating light to leak out to the second medium surrounding the second optical fiber having a greater diameter.

Patent Document 2 discloses a cladding-mode absorber unit including two end regions and a center region, the two end regions each having a smaller diameter, the center region having a greater diameter sandwiched by the two end regions and covered by an absorber made of liquid metal. Since the absorber is arranged to directly contact with the cladding of the center region, light propagating through the cladding can be absorbed by the absorber in the center region.

PRIOR ART DOCUMENTS

Patent Documents

[Patent Document 1] Japanese Patent Publication No. 5820034

[Patent Document 2] Published Japanese Translation No. 2015-505162 of a PCT International Publication In the optical device disclosed in Patent Document 1, light launched from the first optical fiber into the cladding of the second optical fiber may not be sufficiently removed in the second medium.

Further, the energy density of light (unnecessary light) launched from the second optical fiber into the cladding of the first optical fiber may rapidly increase in the first optical fiber due to its smaller diameter, which may impart damage to the first optical fiber and/or optical components (e.g., FBG) connected thereto.

In the cladding-mode absorber unit disclosed in Patent Document 2, since the step of fixedly joining liquid metal of a dissimilar material with the cladding is complicating, the manufacturing cost may increase. Since it is difficult to tightly adhere liquid metal to the cladding over the entire range where the absorber is arranged, the stability of the manufacturing may not be sufficient.

In addition, since all of light which is not absorbed by the liquid metal will be reflected and returned into the cladding, the light in the cladding may not be sufficiently removed within a limited distance. In particular, when gaps exist between the liquid metal and the cladding, the removal of the light in the cladding may be more insufficient.

SUMMARY

One or more embodiments of the present invention provide an optical component as well as a fiber laser unit and a fiber laser system using the optical component, the optical component having a simple structure and enabling suppression of deterioration of a coating which covers an optical fiber and sufficient removal of unnecessary light propagating through the cladding.

(1) An optical component according to one or more embodiments of the present invention includes: a first fiber having a first end and a second end, the first fiber including a core and a cladding, the core and the cladding capable of being optically coupled to an optical resonator at the first end; a second fiber having a third end and a fourth end, the third end connected to the second end, the second fiber including a core and a cladding, the core and the cladding of the second fiber directly connected to the core and the cladding of the first fiber at the third end; a third fiber having a fifth end and a sixth end, the fifth end connected to the fourth end, the third fiber including a core and a cladding, the core and the cladding of the third fiber directly connected to the core and the cladding of the second fiber at the fifth end; a first coating layer covering the cladding of the second fiber and having a higher refractive index than a refractive index of the cladding of the second fiber; and a first high refractive index layer covering, at the fourth end, part of an outer peripheral surface of the cladding of the second fiber and at least part of an end face of the second fiber, the first high refractive index layer having a higher refractive index than the refractive index of the cladding of the second fiber, in which an outer diameter of the cladding of the first fiber is smaller than an outer diameter of the cladding of the second fiber, and an outer diameter of the cladding of the third fiber is smaller than the outer diameter of the cladding of the second fiber.

(2) The above-described optical component (1) may further includes a second high refractive index layer covering, at the third end, part of the outer peripheral surface of the cladding of the second fiber and at least part of an end face of the second fiber.

(3) In the above-described optical components (1)-(2), it may be arranged such that the outer diameter of the cladding of the first fiber is smaller than the outer diameter of the cladding of the third fiber.

(4) In the above-described optical components (1)-(3), it may be arranged such that the first fiber is capable of propagating, at least, the LP01, LP11, LP02, and LP21 modes, and the second fiber is bent so as to allow, at least, modes of higher order than the LP01 mode to leak out from the core of the second fiber to the cladding of the second fiber.

(5) In the above-described optical components (1)-(4), it may be arranged such that the third fiber is capable of propagating, at least, the LP01, LP11, LP02, and LP21 modes, and the second fiber is bent so as to allow, at least, modes of higher order than the LP11 mode to leak out from the core of the second fiber to the cladding of the second fiber.

(6) In the above-described optical components (4)-(5), it may be arranged such that the second fiber includes a first part extending from the third end, a mode filter part continuous to the first part and bent so as to allow modes of higher order than the LP11 mode to leak out from the core of the second fiber to the cladding of the second fiber, and a second part continuous to the mode filter part and extending to the fourth end, a radius of curvature of the mode filter part is equal to or less than the maximum radius of curvature of the first part and the second part, the first part has a linear part linearly extending from the third end, and the second part has a linear part linearly extending from the fourth end.

(7) The above-described optical components (1)-(6) may further include a second coating layer covering the cladding of the third fiber and having a higher refractive index than a refractive index of the cladding of the third fiber, in which the cladding of the third fiber having a trench.

(8) In the above-described optical components (1)-(7), it may be arranged such that the first high refractive index layer covers part of an outer peripheral surface of the cladding of the third fiber at the fifth end.

(9) A fiber laser unit according to one or more embodiments of the present invention includes: a plurality of pumping light sources; a combiner which combines lights emitted from the pumping light sources to generate a combined light; an optical resonator which amplifies the combined light; and any one of the above-described the optical components (1) to (8) into which a light emitted from the optical resonator is launched.

(10) A fiber laser system according to one or more embodiments of the present invention includes: a plurality of fiber laser units; an output combiner which combines lights outputted from the fiber laser units and thereby emit a combined light; and any one of the above-described optical components (1) to (8) into which the combined light is launched.

According to one or more embodiments of the present invention, it will be possible to provide an optical component as well as a fiber laser unit and a fiber laser system using the optical component, the optical component having a simple structure and enabling suppression of deterioration of a coating which covers an optical fiber and sufficient removal of unnecessary light propagating through the cladding.

DETAILED DESCRIPTION

Hereinafter, an optical component, a fiber laser unit, and a fiber laser system according to one or more embodiments of the present invention will be explained with reference to the drawings.

Figure 1:
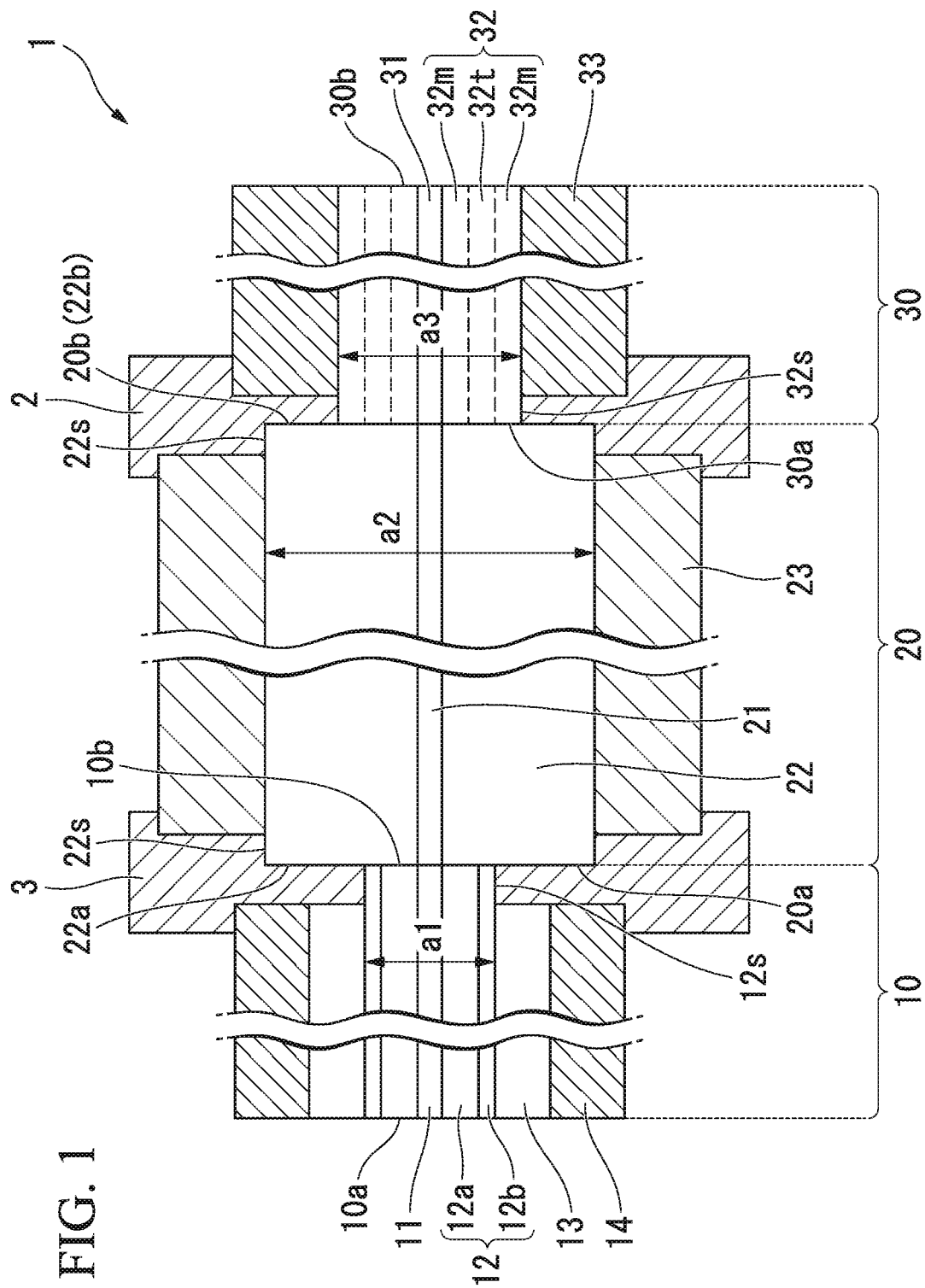
FIG. 1 is a cross-sectional view showing a cross section of an optical component according to one or more embodiments.

FIG. 1 is a cross-sectional view showing a cross section of an optical component 1 according to one or more embodiments. The optical component 1 includes a first fiber 10, a second fiber 20, and a third fiber 30.

The first fiber 10 has a first end 10a and a second end 10b and includes a core 11 and a cladding 12 which are capable of being optically coupled with a later described optical resonator 40 at the first end 10a.

The second fiber 20 has a third end 20a connected to the second end 10b and a fourth end 20b and includes a core 21 and a cladding 22 which are directly connected to the core 11 and the cladding 12 of the first fiber 10 at the third end 20a.

The third fiber 30 has a fifth end 30a connected to the fourth end 20b and a sixth end 30b and includes a core 31 and a cladding 32 which are directly connected to the core 21 and the cladding 22 of the second fiber 20 at the fifth end 30a.

The first fiber 10, the second fiber 20, and the third fiber 30 may be an optical fiber including one or more cladding (including air cladding) such as a single cladding optical fiber, a double cladding optical fiber, or a triple cladding optical fiber.

In the example of FIG. 1, the first fiber 10 is a triple cladding optical fiber including a first cladding 12a, a second cladding 12b, and a third cladding 13. The second fiber 20 is a single cladding optical fiber including the cladding 22, while the third fiber 30 is a single cladding optical fiber including the cladding 32.

It is noted that, in the following explanation, all the claddings covering any of the cores at the connection point between the first fiber 10 and the second fiber 20 and in the vicinity thereof may be referred to as a cladding. Similarly, all the claddings covering any of the cores at the connection point between the second fiber 20 and the third fiber 30 and in the vicinity thereof may be referred to as a cladding.

The cladding 12 of the first fiber 10 (i.e., the first cladding 12a and the second cladding 12b) covers the core 11 so as to be in direct contact with the core 11. Similarly, the cladding 22 of the second fiber 20 covers the core 21 so as to be in direct contact with core 21, while the cladding 32 of the third fiber 30 covers the core 31 so as to be in direct contact with the core 31.

The diameters of the core 11, the core 21, and the core 31 are the same as each other.

The optical component 1 further includes a first coating layer 23 and a first high refractive index layer 2.

The first coating layer 23 covers the cladding 22 of the second fiber 20 and has a higher refractive index than the refractive index of the cladding 22 of the second fiber 20.

The first coating layer 23 protects the second fiber 20 and is capable of absorbing unnecessary light propagating through the cladding 22. In the example of FIG. 1, the first coating layer 23 covers an outer peripheral surface 22s of the cladding 22 so as to expose the outer peripheral surface 22s at the third end 20a and the fourth end 20b and be in direct contact with the outer peripheral surface 22s.

The first high refractive index layer 2 covers, at the fourth end 20b, part of the outer peripheral surface 22s of the cladding 22 and at least part of the end face 22b of the second fiber 20, and has a higher refractive index than the refractive index of the cladding 22 of the second fiber 20.

In the example of FIG. 1, the first high refractive index layer 2 covers the entire face of the end face 22b, except for the area contacting the third fiber 30, and part of the outer peripheral surface 22s in a continuous manner so as to be in direct contact therewith. More specifically, the first high refractive index layer 2 covers the outer peripheral surface 22s in a certain range from the end face 22b.

Accordingly, unnecessary light which propagates through the cladding 22 of the second fiber 20 toward the third fiber 30 and then reaches the end face 22b, except for the area contacting the third fiber 30, will be extracted to the outside of the second fiber 20 by the first high refractive index layer 2 and thus removed.

As exemplarily shown in FIG. 1, the outer diameter a1 of the cladding 12 of the first fiber 10 is smaller than the outer diameter a2 of the cladding 22 of the second fiber 20, while the outer diameter a3 of the cladding 32 of the third fiber 30 is smaller than the outer diameter a2 of the cladding 22 of the second fiber 20.

The first fiber 10 and the second fiber 20 having such a different outer diameter of the cladding are mutually connected at the third end 20a (the second end 10b) using well-known method such as fusion splice. Similarly, the second fiber 20 and the third fiber 30 having such a different outer diameter of the cladding are mutually connected at the fourth end 20b (the fifth end 30a) using well-known method such as fusion splice.

Light launched into the second fiber 20 from the first fiber 10 may include unnecessary light such as pumping light which is not absorbed by a core of a later described light amplification fiber 44 of an optical resonator 40. Since the outer diameter a1 of the cladding 12 of the first fiber 10 is smaller than the outer diameter a2 of the cladding 22 of the second fiber 20, such unnecessary light will be coupled to the cladding 22 of the second fiber 20 at the third end 20a of the second fiber 20.

The unnecessary light coupled to the second fiber 20 will propagate through the cladding 22 while spreading over the cladding 22. Light reaching the first coating layer 23, which covers the cladding 22, will be absorbed by the first coating layer 23, converted into heat and removed. Since a1<a2, the density of unnecessary light reaching the interface between the cladding 22 of the second fiber 20 and the first coating layer 23 will become smaller than the density of unnecessary light propagating through the first fiber 10. Accordingly, it will be possible to suppress deterioration of the coating layer which absorbs unnecessary light in the optical component 1.

Light launched into the second fiber 20 from the third fiber 30 may include unnecessary light such as reflection light reflected at a work piece and Raman-scattered light generated by the reflection. Since the outer diameter a3 of the cladding 32 of the third fiber 30 is smaller than the outer diameter a2 of the cladding 22 of the second fiber 20, such unnecessary light will be coupled to the cladding 22 of the second fiber 20 at the fourth end 20b of the second fiber 20.

The unnecessary light coupled to the second fiber 20 will propagate through the cladding 22 while spreading over the cladding 22. Light reaching the first coating layer 23, which covers the cladding 22, will be absorbed by the first coating layer 23, converted into heat, and removed. Since a3<a2, the density of unnecessary light reaching the interface between the cladding 22 of the second fiber 20 and the first coating layer 23 will become smaller than the density of unnecessary light propagating through the third fiber 30. Accordingly, it will be possible to suppress deterioration of the coating layer which absorbs unnecessary light in the optical component 1.

Figure 2:
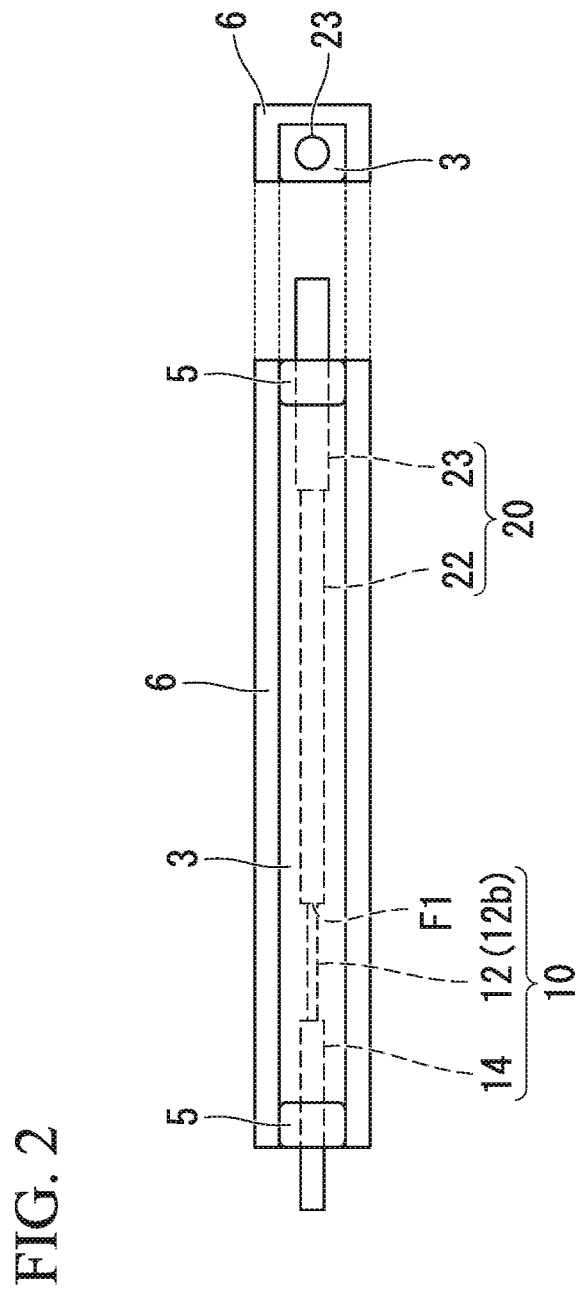
FIG. 2 is a two view showing an example of a connection structure in an optical component according to one or more embodiments.

FIG. 2 is a two view showing an example of a connection structure between the first fiber 10 and the second fiber 20.

In the example of the figure, the first fiber 10 and the second fiber 20 are mutually connected at a connection point F1 such that the center axis of the first fiber 10 is aligned with the center axis of the second fiber 20. The first fiber 10 and the second fiber 20 are each fixed by a fixing member 5 in a recess of a heat radiator 6 having a U shape cross section.

At the connection point F1 and in the vicinity thereof, the third cladding 13 and coating (e.g., later described third coating layer 14) of the first fiber 10 are omitted and the first coating layer 23 covering the second fiber 20 is omitted as well.

The fixing member 5 may be made of a material, such as adhesive agent, capable of filling the gap between the heat radiator 6 and the optical fiber. The heat radiator 6 may be made of a material, such as metal, having a high thermal conductivity.

As exemplarily shown in FIG. 2, the recess of the heat radiator 6 may be filled with a resin (later described second high refractive index layer 3). In this case, the coating 14 and the cladding 12 (12b) of the first fiber 10 as well as the cladding 22 of the second fiber 20 and the first coating layer 23 will be covered by the resin in the recess of the heat radiator 6.

Figure 3:
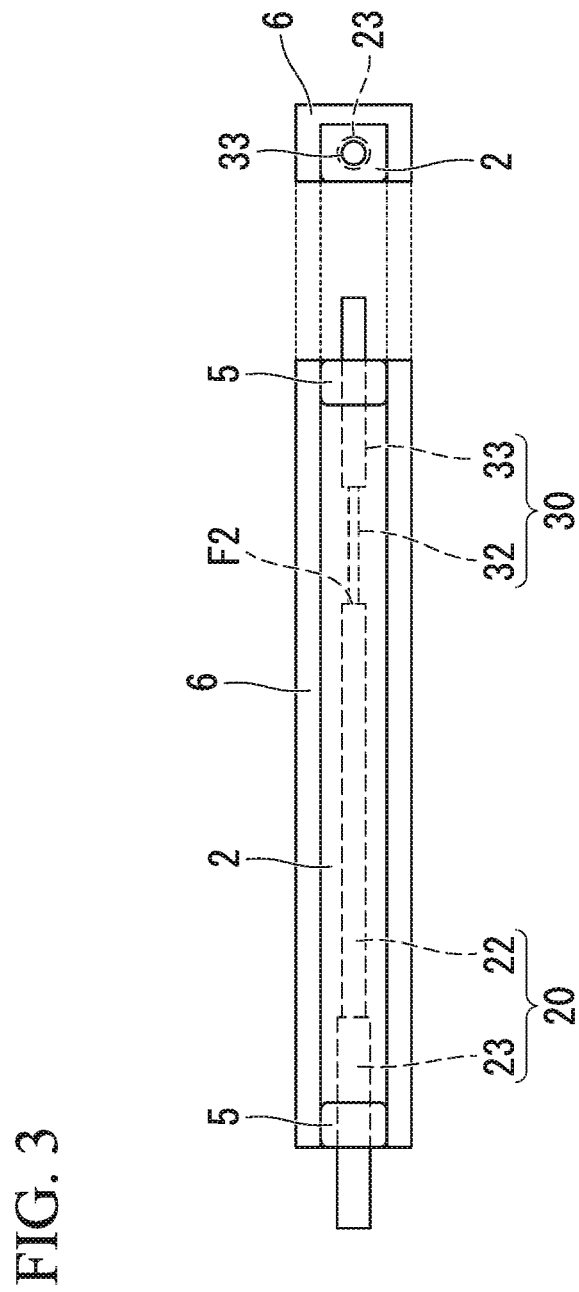
FIG. 3 is a two view showing an example of a connection structure in an optical component according to one or more embodiments.

FIG. 3 is a two view showing an example of a connection structure between the second fiber 20 and the third fiber 30.

In the example of the figure, the second fiber 20 and the third fiber 30 are mutually connected at a connection point F2 such that the center axis of the second fiber 20 is aligned with the center axis of the third fiber 30. The second fiber 20 and the third fiber 30 are each fixed by the fixing member 5 in the recess of the heat radiator 6 having a U shape cross section.

At the connection point F2 and in the vicinity thereof, the first coating layer 23 covering the second fiber 20 is omitted and coating of the third fiber 30 (e.g., later described second coating layer 33) is also omitted.

As exemplarily shown in FIG. 3, the recess of the heat radiator 6 may be filled with a resin (first high refractive index layer 2). In this case, the first coating layer 23 covering the second fiber 20 and the cladding 22 as well as the cladding 32 of the third fiber 30 and the coating 33 will be covered by the resin in the recess of the heat radiator 6.

According to the above-described optical component 1 which includes the first high refractive index layer 2 covering, at the fourth end 20b (i.e., output end) of the second fiber, 20, part of the outer peripheral surface 22s of the cladding 22 and at least part of the end face 22b of the second fiber 20, and having a higher refractive index than the refractive index of the cladding 22 of the second fiber 20, it is possible to allow unnecessary light, which is launched from the first fiber 10 into to the cladding 22 of the second fiber 20 and not removed in the first coating layer 23 (e.g., pumping light not absorbed in the core of the light amplification fiber 44 of the later described optical resonator 40), to leak out to the first high refractive index layer 2 to be removed.

Moreover, since the outer diameter a1 of the cladding 12 of the first fiber 10 is smaller than the outer diameter a2 of the cladding 22 of the second fiber 20, it is possible to allow unnecessary light, which is launched from the first fiber 10 into the cladding 22 of the second fiber 20 (e.g., pumping light not absorbed in the core of the light amplification fiber 44 of the later described optical resonator 40), to leak out to the first coating layer 23 covering the second fiber 20 to be removed, while reducing the energy density of the light in the cladding 22 of the second fiber 20. Thus, it is possible to suppress the deterioration of the first coating layer 23 due to the absorption of unnecessary light.

Further, since the outer diameter a3 of the cladding 32 of the third fiber 30 is smaller than the outer diameter a2 of the cladding 22 of the second fiber 20, it is possible to allow unnecessary light, which is launched from the third fiber 30 into the cladding 22 of the second fiber 20 (e.g., reflection light reflected at a work piece and Raman-scattered light generated by the reflection), to leak out to the first coating layer 23 covering the second fiber 20 to be removed, while reducing the energy density of the light in the cladding 22 of the second fiber 20. Thus, it is possible to suppress the deterioration of the first coating layer 23 due to the absorption of unnecessary light.

The optical component 1 may further include a second high refractive index layer 3 covering, at the third end 20a, part of the outer peripheral surface 22s of the cladding 22 and at least part of the end face 22a of the second fiber 20.

In this case, since the second high refractive index layer 3 is provided, which covers, at the third end 20a of the second fiber 20 (i.e., input end), part of the outer peripheral surface 22s of the cladding 22 and at least part of the end face 22a of the second fiber 20 and has a higher refractive index than the refractive index of the cladding 22 of the second fiber 20, it is further possible to allow unnecessary light, which is launched from the third fiber 30 into the cladding 22 of the second fiber 20 and not removed in the first coating layer 23, to leak out to the second high refractive index layer 3 to be removed.

In the example of FIG. 1, the second high refractive index layer 3 covers the entire face of the end face 22a, except for the area contacting the first fiber 10, and part of the outer peripheral surface 22s in a continuous manner so as to be in direct contact therewith. More specifically, the second high refractive index layer 3 covers the outer peripheral surface 22s in a certain range from the end face 22a. Accordingly, unnecessary light which propagates through the cladding 22 of the second fiber 20 toward the first fiber 10 and reaches the end face 22a, except for the area contacting the first fiber 10, will be extracted to the outside of the second fiber 20 by the second high refractive index layer 3 and thus removed.

The outer diameter a1 of the cladding 12 of the first fiber 10 may be smaller than the outer diameter a3 of the cladding 32 of the third fiber 30. The power of unnecessary light P3 reaching the first fiber 10 is expressed as P2×(a1)^2/(a3)^2−L, where P2 is the power of unnecessary light launched from the cladding 32 of the third fiber 30 into the second fiber 20 and L is the loss of the unnecessary light in the second fiber 20.

In the optical component 1 which meets a1<a3, the power of unnecessary light reaching the first fiber 10 from the third fiber 30 through the second fiber 20 will become less compared to an optical component which meets a1≥a3, and thus less light will return to the optical resonator 40 (light amplification fiber 44), which thereby prevents unstable output and parasitic oscillation of the optical resonator 40.

The third end of the second fiber 20 may have a tapered shape. More specifically, the outer peripheral surface 22s of the cladding 22 of the second fiber 20 may have an inclined surface at the third end, which inclines so as to be substantially continuous with the outer peripheral surface 12s of the cladding 12 of the first fiber 10.

In this case, since the diameter of the cladding 22 (12) changes substantially continuously from the first fiber 10 to the second fiber 20, it is possible to allow unnecessary light to be removed at various areas in a distributed manner in the optical component 1. Note that the inclined surface at the third end in this configuration corresponds to the above-described end face 22a.

The fourth end of the second fiber 20 may have a tapered shape. More specifically, the outer peripheral surface 22s of the cladding 22 of the second fiber 20 may have an inclined surface at the fourth end, which inclines so as to be substantially continuous with the outer peripheral surface 32s of the cladding 32 of the third fiber 30. In this case, since the diameter of the cladding 22 (32) changes substantially continuously from the second fiber 20 to the third fiber 30, it is possible to allow unnecessary light to be removed at various areas in a distributed manner Note that the inclined surface at the fourth end in this configuration corresponds to the above-described end face 22b.

As exemplarily shown in FIG. 1, the outer diameter of the cladding may discontinuously change at the connection point between the first fiber 10 and the second fiber 20. More specifically, the outer peripheral surface 22s of the cladding 22 of the second fiber 20 and the end face 22a of the second fiber 20 may be substantially perpendicular to each other.

In this case, particularly, unnecessary light propagating from the second fiber 20 to the first fiber 10 will be efficiently removed at the end face 22a.

Similarly, the outer diameter of the cladding may discontinuously change at the connection point between the second fiber 20 and the third fiber 30. More specifically, the end face 22a of the second fiber 20 and the outer peripheral surface 32s of the cladding 32 of the third fiber 30 may be substantially perpendicular to each other.

In this case, particularly, unnecessary light propagating from the second fiber 20 to the third fiber 30 will be efficiently removed at the end face 22b.

The first fiber 10 may be capable of propagating, at least, the LP01, LP11, LP02, and LP21 modes, and the second fiber 20 may be bent so as to allow, at least, modes of higher order than the LP11 mode to leak out from the core 21 to the cladding 22 of the second fiber 20.

In this case, it will be possible to remove the LP02 mode and modes of higher order than the LP02 mode which are launched from the first fiber 10 into the second fiber 20. In other words, the second fiber 20 may serve as a mode filter.

When using the second fiber 20 as a mode filter, due to the bending of the second fiber 20, it will be possible to allow the LP02 mode and modes of higher order than the LP02 mode to leak out from the core 21 to the cladding 22, and facilitate leak of unnecessary light propagating through the cladding 22 to the outside of the cladding 22 as well. Light leaked out to the outside of the cladding 22 can be removed by the first coating layer 23 or the first high refractive index layer 2.

The third fiber 30 may be capable of propagating, at least, the LP01, LP11, LP02, and LP21 modes, and the second fiber 20 may be bent so as to allow, at least, modes of higher order than the LP11 mode to leak out from the core 21 to the cladding 22 of the second fiber 20.

In this case, it will be possible to remove the LP02 mode and modes of higher order than the LP02 mode which are launched from the third fiber 30 to the second fiber 20. In other words, the second fiber 20 may serve as a mode filter.

When using the second fiber 20 as a mode filter, due to the bending of the second fiber 20, it will be possible to allow the LP02 mode and modes of higher order than the LP02 mode to leak out from the core 21 to the cladding 22, and facilitate leak of unnecessary light propagating through the cladding 22 to the outside of the cladding 22 as well. Light leaked out to the outside of the cladding 22 can be removed by the first coating layer 23 or the first high refractive index layer 2.

In particular, even when unnecessary light such as reflection light reflected at a work piece and Raman-scattered light generated by the reflection propagates through the core 31 of the third fiber 30 and cladding 32 and then launches into the core 21 of the second fiber 20, the above-described bending enables the LP02 mode and modes of higher order than the LP02 mode to be removed from the core 21.

Accordingly, less light will return to the optical resonator 40 (light amplification fiber 44) and thus, it is possible to prevent unstable output and parasitic oscillation of the optical resonator 40.

Figure 4:
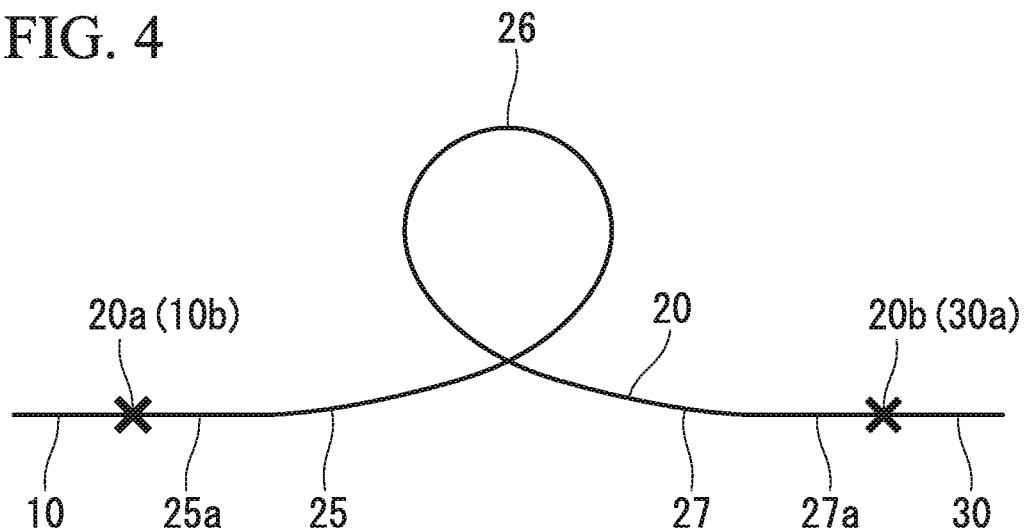
FIG. 4 is an explanatory view showing an example of an arrangement of a second fiber.

As exemplarily shown in FIG. 4, the second fiber 20 may include a first part 25 extending from the third end 20a, a mode filter part 26 continuous to the first part 25 and bent so as to allow modes of higher order than the LP11 mode to leak out from the core 21 of the second fiber 20, and a second part 27 continuous to the mode filter part 26 and extending to the fourth end 20b. The radius of curvature of the mode filter part 26 may be equal to or less than the maximum radius of curvature $r_{max}$ of the first part 25 and the second part 27, the first part 25 may have a linear part 25a linearly extending from the third end 20a, and the second part 27 may have a linear part 27a linearly extending from the fourth end 20b.

In this case, of all light launched from the first fiber 10 into the second fiber 20, only light having a certain or greater NA will leak out at the first part 25, and the rest of light will leak out at the mode filter part 26. In particular, light having relatively a high NA will leak out at the linear part 25a which extends from the third end of the second fiber 20. Moreover, the modes of higher order which are leaked out from the core 21 to the cladding 22 in the mode filter part 26 will be mainly removed in the mode filter part 26. Accordingly, unnecessary light can be removed at various areas in a distributed manner in the second fiber 20. In other words, it will be possible to suppress local heating in the second fiber 20 of the optical component 1.

As is similar to light launched from the third fiber 30 into the second fiber 20, only light having a certain or greater NA will leak out at the second part 27, and the rest of light will leak out at the mode filter part 26. In particular, light having relatively a high NA will leak out at the linear part 27a which extends from the fourth end 20b of the second fiber 20. Moreover, the modes of higher order which are leaked out from the core 21 to the cladding 22 in the mode filter part 26 will be mainly removed in the mode filter part 26. Accordingly, unnecessary light can be removed at various areas in a distributed manner in the second fiber 20. In other words, it will be possible to suppress local heating in the second fiber 20 of the optical component 1.

As exemplarily shown in FIG. 1, the optical component 1 may further include a second coating layer 33 covering the cladding 32 of the third fiber 30 and having a higher refractive index than the refractive index of the cladding of the third fiber 30, and the cladding 32 of the third fiber 30 may have a trench 32t.

In the example of FIG. 1, the cladding 32 has a cladding main part 32m and the trench 32t having an annular shape in a cross section perpendicular to the longitudinal direction of the third fiber 30. The cladding main part 32m is divided into two by the trench 32t.

The refractive index of the trench 32t is lower than the refractive index of the adjacent cladding main part 32m. For this reason, light launched into the cladding main part 32m outside the trench 32t will be confined between the trench 32t and the second coating layer 33 to be absorbed by the second coating layer 33.

The trench 32t may be provided by doping the cladding 32 with substance(s), such as fluorine, that reduces the refractive index.

According to the above-described configuration, since unnecessary light launched from the second fiber 20 into the outside of the trench 32t of the third fiber 30 will leak out to the second coating layer 33 to be removed while being prevented from entering into the inside of the trench 32t, it will be possible to remove unnecessary light even in areas which are away from the connection point between the second fiber 20 and the third fiber 30. Accordingly, unnecessary light can be removed at various areas in a distributed manner in the third fiber 30. In particular, unnecessary light having relatively a large NA generated at the connection point between the second fiber 20 and the third fiber 30 can be removed.

As exemplarily shown in FIG. 1, the optical component 1 may include a third coating layer 14 covering the outermost cladding (third cladding 13) of the first fiber 10 and having a higher refractive index than the refractive index of the outermost cladding of the first fiber 10.

In this case, since unnecessary light launched from the second fiber 20 into the first fiber 10 will leak out to the third coating layer 14 to be removed, it will be possible to remove unnecessary light even in areas which are away from the connection point between the first fiber and the second fiber. In particular, unnecessary light having relatively high NA generated at the connection point between the first fiber 10 and the second fiber 20 can be securely removed.

As exemplarily shown in FIG. 1, the first high refractive index layer 2 may cover part of the outer peripheral surface 32s of the cladding 32 of the third fiber 30 at the fifth end 30a.

In this case, unnecessary light propagating from the second fiber 20 to the cladding 32 of the third fiber 30 can be absorbed by the first high refractive index layer 2.

In addition, since the refractive index of the first high refractive index layer 2 is higher than the refractive index of the cladding 22 of the second fiber 20 and the cladding 32 of the third fiber 30, it will be possible to remove part of unnecessary light, which propagates through the cladding 32 of the third fiber 30 towards the second fiber 20, at the first high refractive index layer 2 (i.e., the energy density of unnecessary light can be reduced) and prevent unnecessary light from entering from the first high refractive index layer 2 into the second fiber 20.

Further, it will be possible to remove unnecessary light reflected at the end face 22b of the second fiber 20 by the first high refractive index layer 2 covering the cladding 32 of the third fiber 30. Thus, it will be possible to suppress local heating in the third fiber 30 due to unnecessary light while preventing unnecessary light from entering from the third fiber 30 into the second fiber 20.

According to one example of the optical component 1, the core 11 (21, 31) has an outer diameter of 28 µm, the first cladding 12a has an outer diameter of 80 µm, the second cladding 12b has an outer diameter of 90 µm, the third cladding 13 has an outer diameter of 160 µm, the third coating layer 14 has an outer diameter of 250 μm, the cladding 22 has an outer diameter of 195 μm, the first coating layer 23 has an outer diameter of 320 μm, the cladding 32 has an outer diameter of 125 μm, the trench 32t has an inner diameter of 60 μm, the trench 32t has an outer diameter of 100 μm, and the second coating layer 33 has an outer diameter of 250 μm.

Figure 5:
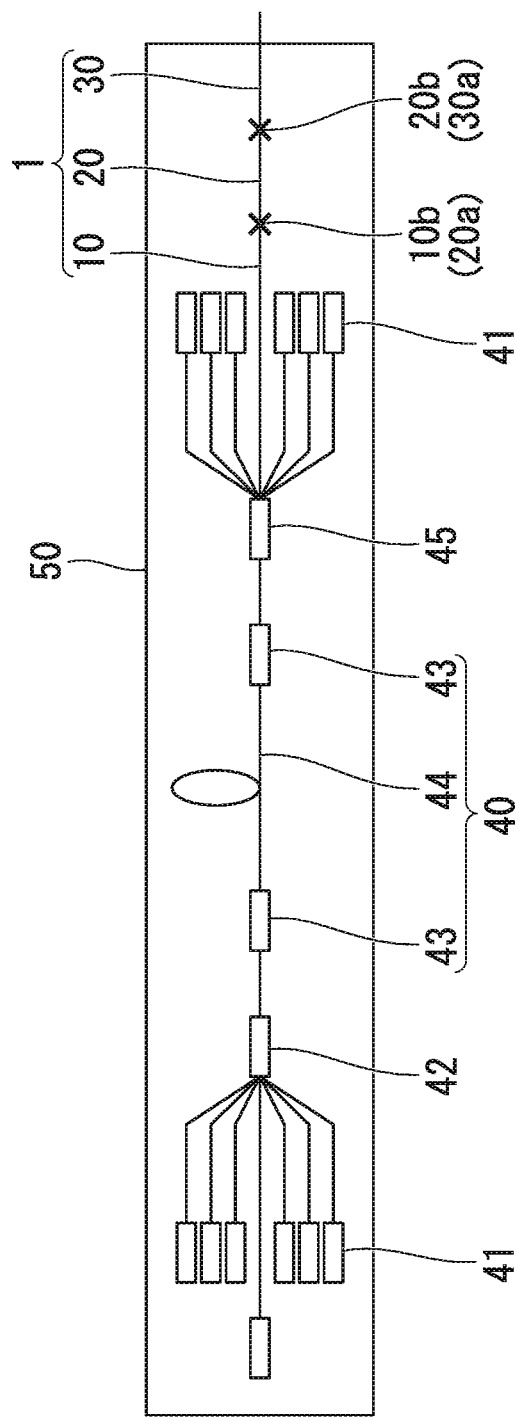
FIG. 5 is a schematic view showing a configuration of a fiber laser unit according to one or more embodiments.

Referring to FIG. 5, a fiber laser unit 50 according to one or more embodiments includes a plurality of pumping light sources 41, a combiner 42 which combines lights emitted from the pumping light sources 41 to generate a combined light, an optical resonator 40 which amplifies the combined light, and an optical component 1 into which a light emitted from the optical resonator 40 is launched.

The fiber laser unit 50 exemplarily shown in the figure includes a forward combiner 42 which combines lights emitted from the pumping light source 41 and propagating forward (i.e., to the right direction in the figure), and a backward combiner 45 which combines lights emitted from pumping light source 41 and propagating backward (i.e., to the left direction in the figure). The light combined by the forward combiner 42 and the light combined by the backward combiner 45 will be provided to the optical resonator 40.

The optical resonator 40 includes two reflectors 43 and a light amplification fiber 44 arranged between the two reflector 43. The core of the light amplification fiber 44 is doped with a rare earth element(s). Light provided from the forward combiner 42 and the backward combiner 45 (pumping light) will be absorbed by the rare earth element(s) of the light amplification fiber 44 to induce population inversion. The population inversion causes stimulated emission light and the stimulated emission light is amplified between the two reflectors 43.

The reflector 43 may be a FBG, for example. The light amplification fiber 44 may be any optical fiber capable of amplifying light from the pumping light source 41.

The optical component 1 may be arranged on the backward of the optical resonator 40. It may be arranged on the backward of the combiner 45 when the fiber laser unit 50 employs the backward combiner 45.

According to the above-described fiber laser unit 50, it will be possible by the optical component 1 to securely remove unnecessary light generated over the plurality of pumping light sources 41, the optical resonator 40, and the optical component 1. Thus, it is possible to provide a fiber laser unit capable of outputting a high quality beam.

Figure 6:
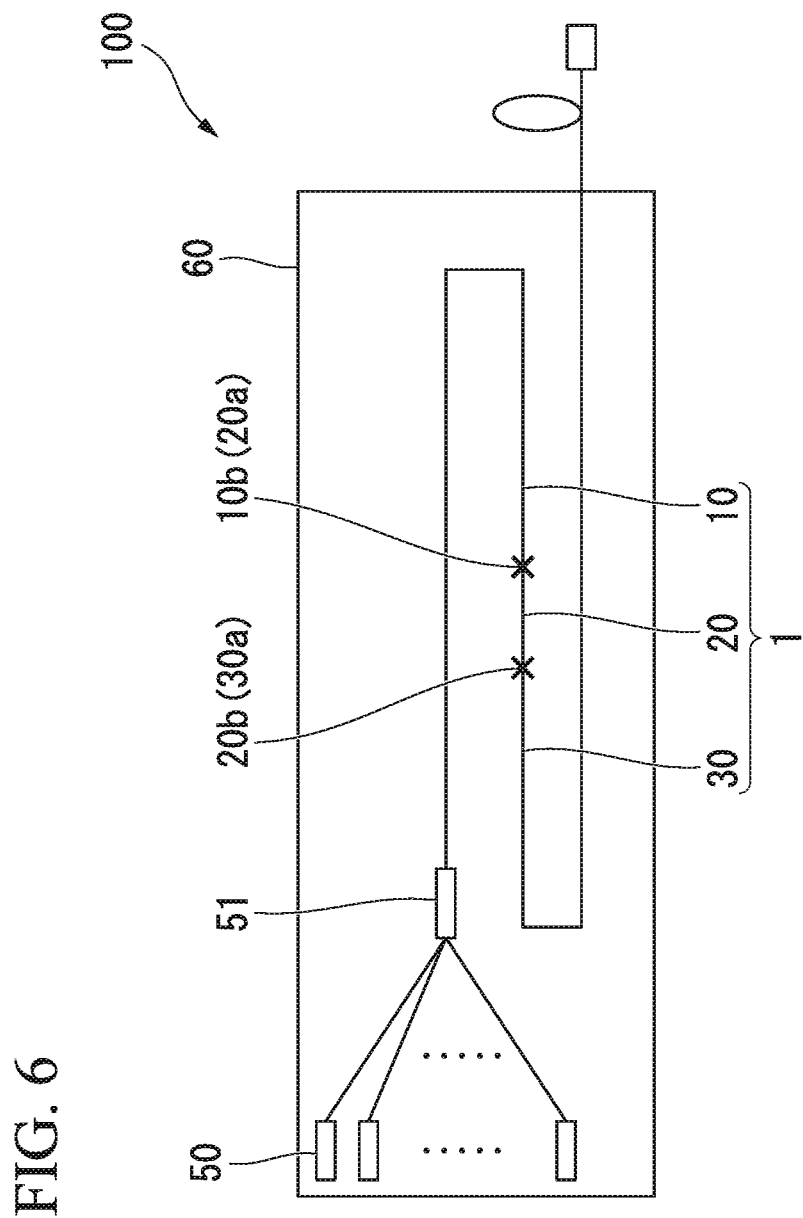
FIG. 6 is a schematic view showing a configuration of a fiber laser system according to one or more embodiments.

Referring to FIG. 6, a fiber laser system 100 according to one or more embodiments includes a plurality of fiber laser units 50, an output combiner 51 which combines lights outputted from the fiber laser units 50 to emit a combined light, and an optical component 1 into which the combined light is launched.

According to the fiber laser system 100, it will be possible by the optical component to securely remove unnecessary light generated over the plurality of fiber laser units and the output combiner, and thus it is possible to provide a fiber laser system capable of outputting a high quality beam.

While embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

According to the above-described embodiments of the present invention, it is possible to provide an optical component as well as a fiber laser unit and a fiber laser system using the optical component, the optical component having a simple structure and enabling suppression of deterioration of a coating which covers an optical fiber and sufficient removal of unnecessary light propagating through the cladding.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF THE REFERENCE SYMBOLS

1 Optical component; 2 First high refractive index layer; 3 Second high refractive index layer; 10 First fiber; 10a First end; 10b Second end; 11, 21, 31 Core; 12, 22, 32 Cladding; 20 Second fiber; 20a Third end; 20b Fourth end; 22s, 32s Outer peripheral surface; 22b End face; 23 First coating layer; 25 First part; 25a, 27a Linear part; 26 Mode filter part; 27 Second part; 30 Third fiber; 30a Fifth end; 30b Sixth end; 32t Trench; 33 Second coating layer; 40 Optical resonator; 41 Pumping light source; 42 Combiner; 50 Fiber laser unit; 51 Output combiner; 100 Fiber laser system

What is claimed is:

1. An optical component comprising:
a first fiber having a first end and a second end, wherein the first fiber comprises a core and a cladding that are optically coupled to an optical resonator at the first end;
a second fiber having a third end and a fourth end, wherein the third end is connected to the second end, and the second fiber comprises a core and a cladding that are directly connected to the core and the cladding of the first fiber at the third end;
a third fiber having a fifth end and a sixth end, wherein the fifth end is connected to the fourth end, and the third fiber comprises a core and a cladding that are directly connected to the core and the cladding of the second fiber at the fifth end;
a first coating layer that covers the cladding of the second fiber and has a higher refractive index than a refractive index of the cladding of the second fiber; and
a first high refractive index layer that covers, at the fourth end, part of an outer peripheral surface of the cladding of the second fiber and at least part of an end face of the second fiber, wherein
the first high refractive index layer has a higher refractive index than the refractive index of the cladding of the second fiber,
wherein an outer diameter of the cladding of the first fiber is smaller than an outer diameter of the cladding of the second fiber, and
wherein an outer diameter of the cladding of the third fiber is smaller than the outer diameter of the cladding of the second fiber.

2. The optical component according to claim 1, further comprising a second high refractive index layer that covers, at the third end, part of the outer peripheral surface of the cladding of the second fiber and at least part of an end face of the second fiber.

3. The optical component according to claim 1, wherein the outer diameter of the cladding of the first fiber is smaller than the outer diameter of the cladding of the third fiber.

4. The optical component according to claim 1,
wherein the first fiber propagates, at least, the LP01, LP11, LP02, and LP21 modes, and
wherein the second fiber is bent to allow, at least, modes of higher order than the LP01 mode to leak out from the core of the second fiber to the cladding of the second fiber.

5. The optical component according to claim 1,
wherein the third fiber propagates, at least, the LP01, LP11, LP02, and LP21 modes, and
wherein the second fiber is bent to allow, at least, modes of higher order than the LP11 mode to leak out from the core of the second fiber to the cladding of the second fiber.

6. The optical component according to claim 4,
wherein the second fiber comprises:
a first part extending from the third end;
a mode filter part continuous to the first part and bent to allow modes of higher order than the LP11 mode to leak out from the core of the second fiber to the cladding of the second fiber; and
a second part continuous to the mode filter part and extending to the fourth end,
wherein a radius of curvature of the mode filter part is equal to or less than a maximum radius of curvature of the first part and the second part,
wherein the first part has a linear part linearly extending from the third end, and
wherein the second part has a linear part linearly extending from the fourth end.

7. The optical component according to claim 1, further comprising a second coating layer that covers the cladding of the third fiber and has a higher refractive index than a refractive index of the cladding of the third fiber, wherein the cladding of the third fiber has a trench.

8. The optical component according to claim 1, wherein the first high refractive index layer covers part of an outer peripheral surface of the cladding of the third fiber at the fifth end.

9. A fiber laser unit comprising:
a plurality of pumping light sources;
a combiner that combines lights emitted from the pumping light sources to generate a combined light;
an optical resonator that amplifies the combined light; and
the optical component according to claim 1 into which a light emitted from the optical resonator is launched.

10. A fiber laser system comprising:
a plurality of fiber laser units;
an output combiner that combines lights outputted from the fiber laser units and emits a combined light; and
the optical component according to claim 1 into which the combined light is launched.

* * * * *